(12) United States Patent
Xu et al.

(10) Patent No.: US 7,533,897 B1
(45) Date of Patent: May 19, 2009

(54) METHOD AND APPARATUS FOR SECURING AN AIR BAG

(75) Inventors: Xiaoping Xu, Rochester Hills, MI (US); Byron Spencer, Bloomfield, MI (US); Leslie A. Wade, Dearborn, MI (US); Andrew P. Katsock, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 378 days.

(21) Appl. No.: 11/353,919

(22) Filed: Feb. 13, 2006

Related U.S. Application Data

(60) Provisional application No. 60/653,600, filed on Feb. 16, 2005.

(51) Int. Cl.
*B60R 21/203* (2006.01)
(52) U.S. Cl. .................... 280/728.2; 280/731
(58) Field of Classification Search .............. 280/728.2, 280/731; 200/61.54
See application file for complete search history.

(56) References Cited

U.S. PATENT DOCUMENTS

| | | | |
|---|---|---|---|
| 4,808,776 A | 2/1989 | Niwa et al. | |
| 6,325,408 B1 * | 12/2001 | Ford | 280/728.2 |
| 6,554,312 B2 * | 4/2003 | Sakane et al. | 280/728.2 |
| 6,565,113 B2 * | 5/2003 | Kassman et al. | 280/728.2 |
| 6,568,702 B1 * | 5/2003 | Ford | 280/728.2 |
| 6,600,114 B2 | 7/2003 | Kikuta et al. | |
| 6,688,638 B2 * | 2/2004 | Schutz | 280/728.2 |
| 6,874,808 B2 * | 4/2005 | Marath et al. | 280/728.2 |

FOREIGN PATENT DOCUMENTS

| | | |
|---|---|---|
| JP | 63-133411 A | 6/1988 |
| JP | 63-181216 A | 2/1989 |
| JP | 05-62380 U | 8/1993 |
| JP | 3028941 U | 7/1996 |

* cited by examiner

*Primary Examiner*—John Q. Nguyen
*Assistant Examiner*—Nicole Verley
(74) *Attorney, Agent, or Firm*—Markell Seitzman

(57) ABSTRACT

An assembly is provided for steering a vehicle including a driver interface operable to enable a driver to steer the vehicle and at least one control member operable to couple the driver interface to the vehicle. An air bag module is coupled to the driver interface and is operable to expand to absorb the kinetic energy of the driver. A horn switch is coupled to the driver interface and the air bag module. The horn switch is operable to generate an electrical signal based on an input from the driver. An attachment mechanism is operable to couple the air bag module and horn switch to the driver interface, and includes at least one retaining member operable to engage the air bag module and armature. The retaining member is operable to release the air bag module and horn switch from the driver interface upon the application of a retractive force.

16 Claims, 15 Drawing Sheets

METHOD AND APPARATUS FOR SECURING AN AIR BAG

This application claims the benefit of U.S. Provisional Applications 60/650,770, filed on Feb. 7, 2005, now U.S. patent application Ser. No. 11/347,078, and 60/653,600, filed on Feb. 16, 2005. The disclosures of the above applications are each incorporated herein by reference.

SUMMARY AND BACKGROUND OF THE INVENTION

The present invention relates to motor vehicle systems and more particularly to a method and apparatus for securing an air bag.

Generally, motor vehicles are equipped with air bag modules, which serve to protect occupants in the motor vehicle. Typically, these air bag modules are secured to the steering wheel via a plurality of screws, which requires extensive assembly time. Accordingly, it is desirable to provide a method and apparatus for securing an air bag that reduces assembly time.

The present invention provides a steering wheel assembly for a vehicle and is primarily directed to an attachment mechanism to secure an airbag module to the armature of the steering wheel. The assembly includes an air bag module coupled to the steering wheel and is operable to expand to absorb the kinetic energy of the driver during an accident. The assembly may include a horn switch coupled to a steering wheel and the air bag module. The horn switch generates an electrical signal based on an input from the driver to activate the vehicle's horn. The attachment mechanism is operable to couple the air bag module and horn switch to the driver interface, and includes at least one moveable retaining member (also referred to as a spring clip) operable to engage the air bag module and an interference slot formed in the steering wheel armature. The retaining member is operable to releasably engage and disengage a plurality of pins associated with the air bag module and to allow removal of the air bag module from the armature upon the application of a retractive or extractive force to the attachment mechanism.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4 and 4a are cross-sectional views of the horn switch, plate and armature taken along section lines 4-4 and 4a-4a of FIG. 5a;

DETAILED DESCRIPTION OF VARIOUS EMBODIMENTS

Figure 1:
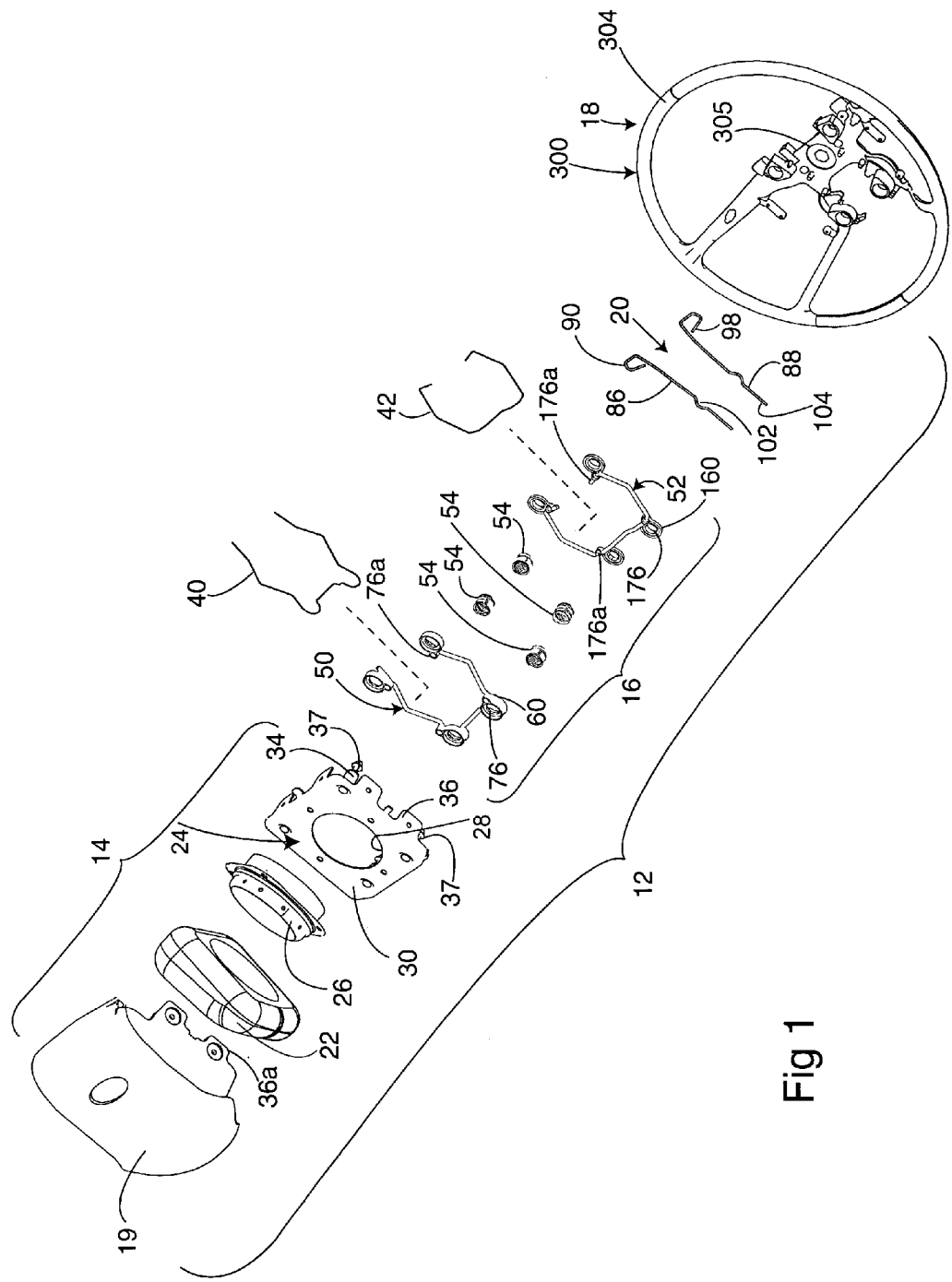
FIG. 1 is an exploded perspective view of the steering wheel and air bag module.

The following description of various embodiments is merely exemplary in nature and is in no way intended to limit the invention, its application, or uses. Although the following description is related generally to an apparatus for securing an air bag module to a steering wheel for use in a motor vehicle, it will be understood that this apparatus could be utilized with any appropriate application. Therefore, it will be understood that the following discussions are not intended to limit the scope of the appended claims.

With reference now to FIGS. 1 through 6, a steering wheel assembly 12 is shown for use with a motor vehicle. The steering wheel assembly 12 includes an air bag module 14, a horn switch 16 and steering wheel 18. The steering wheel comprises a metal armature 300 having spokes 303, a rim 304 and a hub connection 305, which connects the armature to a steering shaft. The armature 300, covered by a foam and/or resin (not shown) molded about the armature, a back cover often connected to the armature, a leather covering and switches often comprise the complete steering wheel. In the illustrated embodiment the horn switch 16 is disposed between the air bag module 14 and the wheel 18, and the air bag module is secured to the steering wheel armature 300 by an attachment mechanism also referred to as a spring clip or retaining member 20. As can be appreciated, the horn switch 16 can be located between any two cooperating members configured to squeeze the elements of the horn switch 16 together.

The air bag module 14 includes a cover 19, which is operable to protect an air bag 22. The cover 19 is illustrated as rectangular; however, any desired shape could be employed. Generally, the cover 19 is made from a polymeric material, such as polyester (TPE), but any other suitable material could be used. The cover 19 may be coupled, in a known manner, to a mounting plate 24 to define a cavity for the receipt of the air bag 22 and an inflator 26. The inflator 26 is operable to fire the air bag 22 upon the determination of a crash event.

Figure 1A:
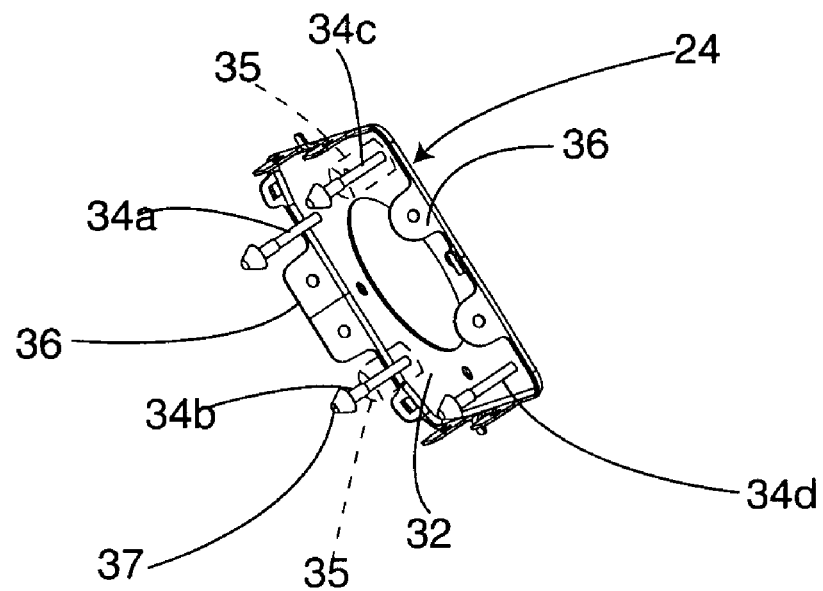
FIG. 1a is an isometric view of a plate of an air bag module.

The plate 24, as shown in FIG. 1a, may include a central aperture 28 to receive and support a portion of the inflator 26, a first or upper side 30, and a second or under side 32. The top side 30 is generally configured to provide an interface for the air bag 22 and inflator 26. The under side 32 of the plate 24 generally includes a plurality of prongs or pins 34 and a plurality of flanges 36 to couple the plate 24 to a similar element 36a on the cover 19. In this embodiment, the second or under side 32 of the plate 24 includes four pins 34, which include at least one attachment mechanism 37, such as conically shaped tip, clip, hook or flange, which are each operable to couple the air bag module 14 and the horn switch 16 to the armature 300, as will be described in greater detail below. The pins 34 may be placed in a number of locations, for example at corners of a virtual rectangle or trapezoid.

The horn switch 16 may include a first housing 50 and a second housing 52. The first switch housing 50 includes four support members 160, each of which includes an opening 76. The second switch housing 52 includes four support members 160, aligned with support members 60; each support member 160 includes a complementary opening 176. Each set of aligned openings 76 and 176 receives one of the first, second, third and fourth prongs 34a-d and bushings 35 (if used) which effectively increase the diameter of each pin. The first horn switch housing 50 and the second horn switch housing 52 are of an open construction having a number of legs or side portions, which can be placed at or located about the central aperture 28 of the mounting plate 24 and any depending portion of the inflator 26. The first housing 50 and second housing 52 each support an electrical conductor 40 and 42 respectively, which is shown in the form of a wire or wire segment. As can be seen in FIG. 1, conductor 40 is generally U-shaped and conductor 42 is generally C-shaped. Each support member 60 and 160 is comprised of an electrically insulative material or sheathing, such as a polymeric material, which forms a protective coating 56 over most of conductors 40 and 42 respectively. The first housing 50 and second housing 52 further define a second plurality of openings 76a and 176a, which are operable to expose the wires 40 and 42. The exposed sections of wire are designated by 40a and 42a. When the exposed section(s) of wire 40a contacts the exposed section of wire 42a an electrical circuit 25 (see FIG. 1a) is closed, enabling the activation of a horn 27.

Figure 4:
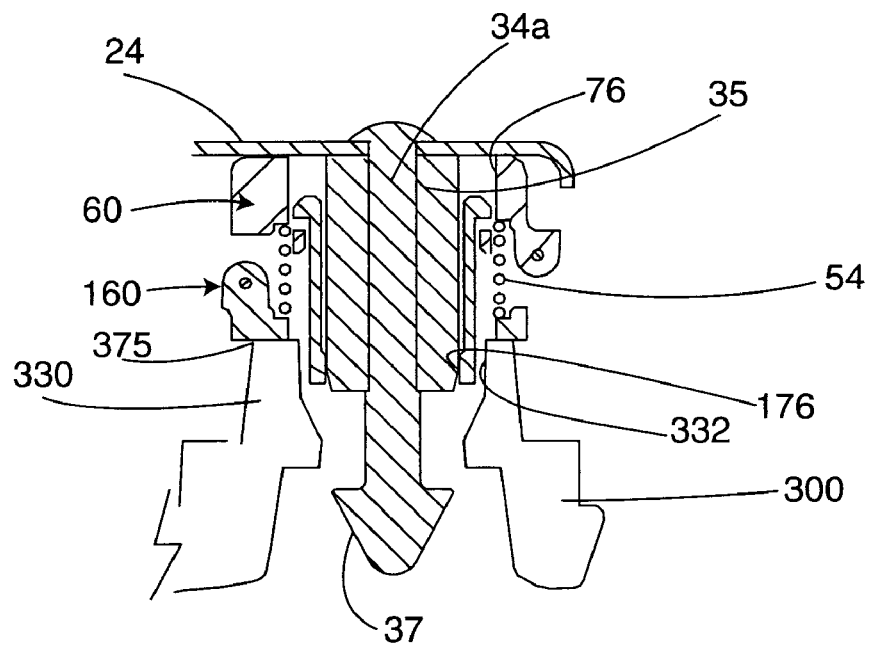
Figure 4A:
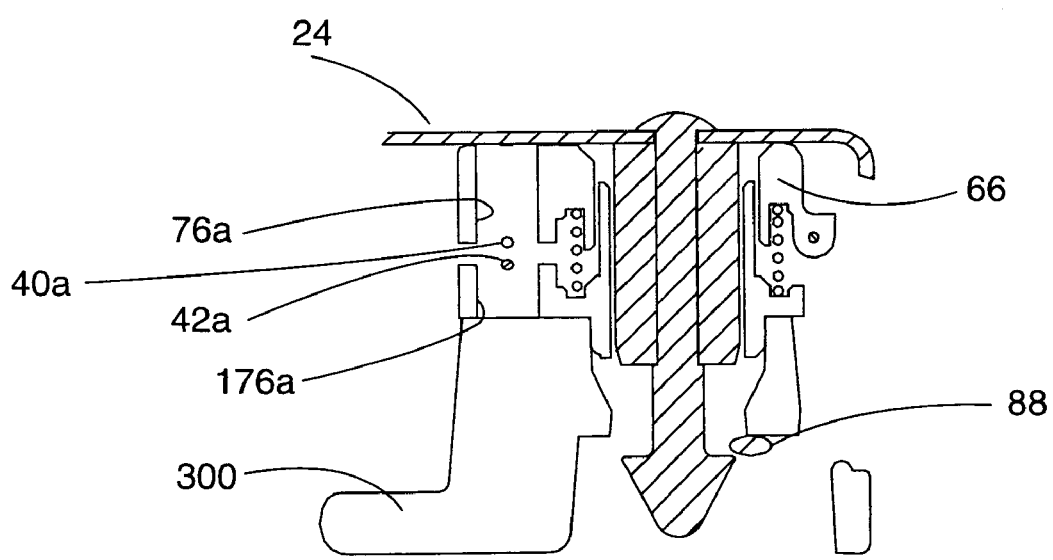
Figure 5:
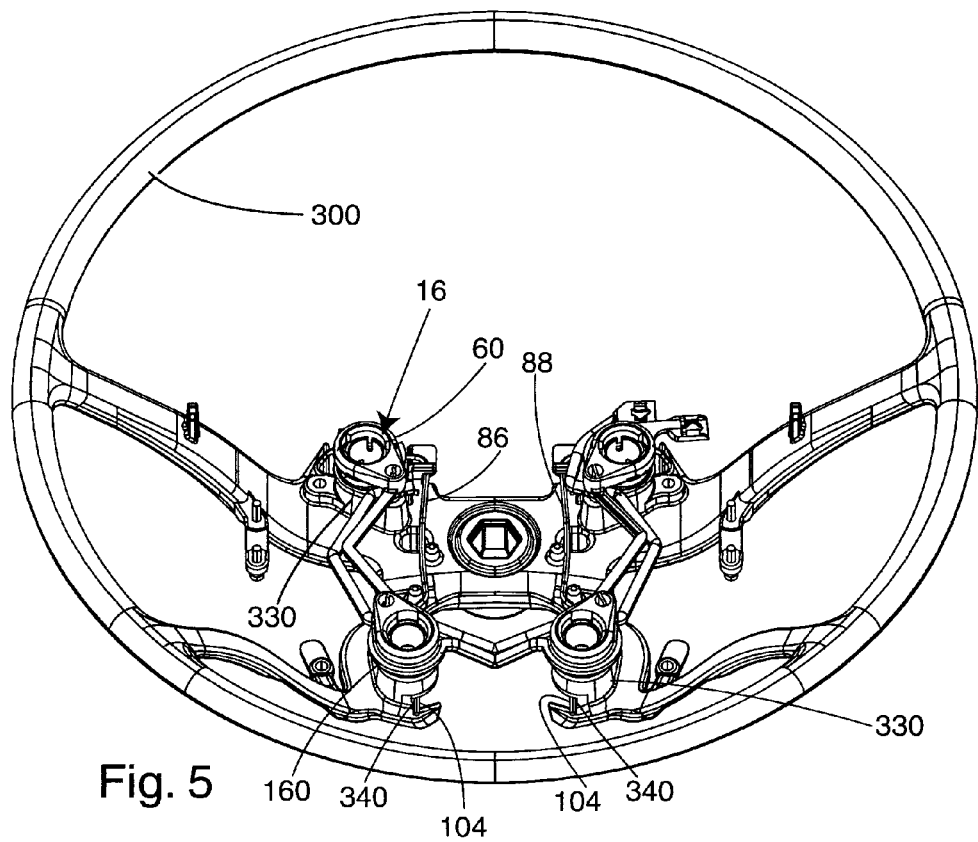
FIG. 5 is an isometric view showing the horn switch upon the armature, which also has an attachment mechanism in place.
Figure 5A:
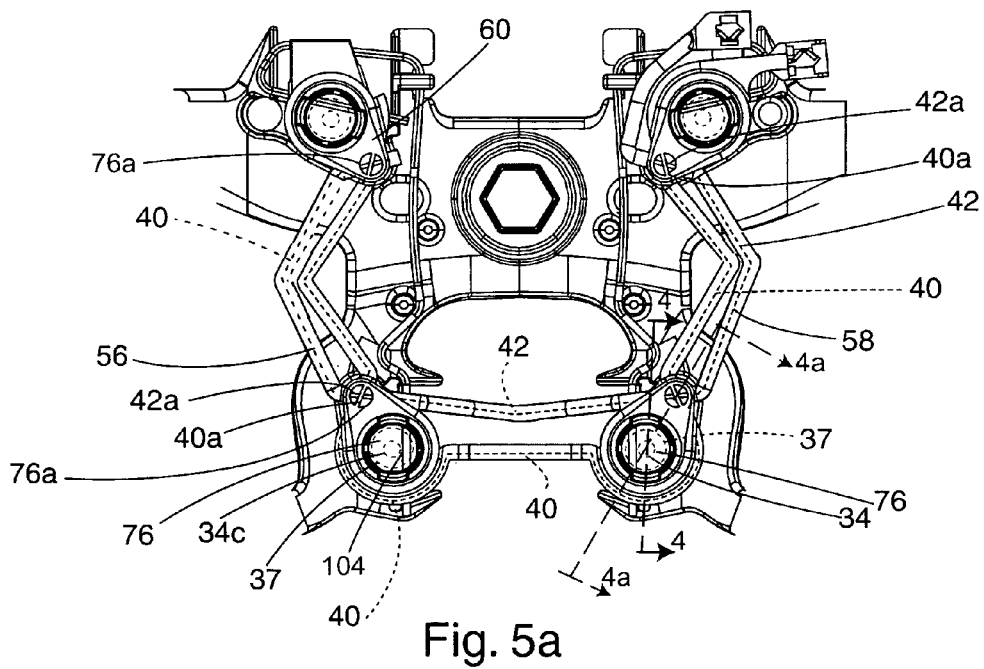
FIG. 5a is a plan view of a horn switch on the armature.
Figure 6:
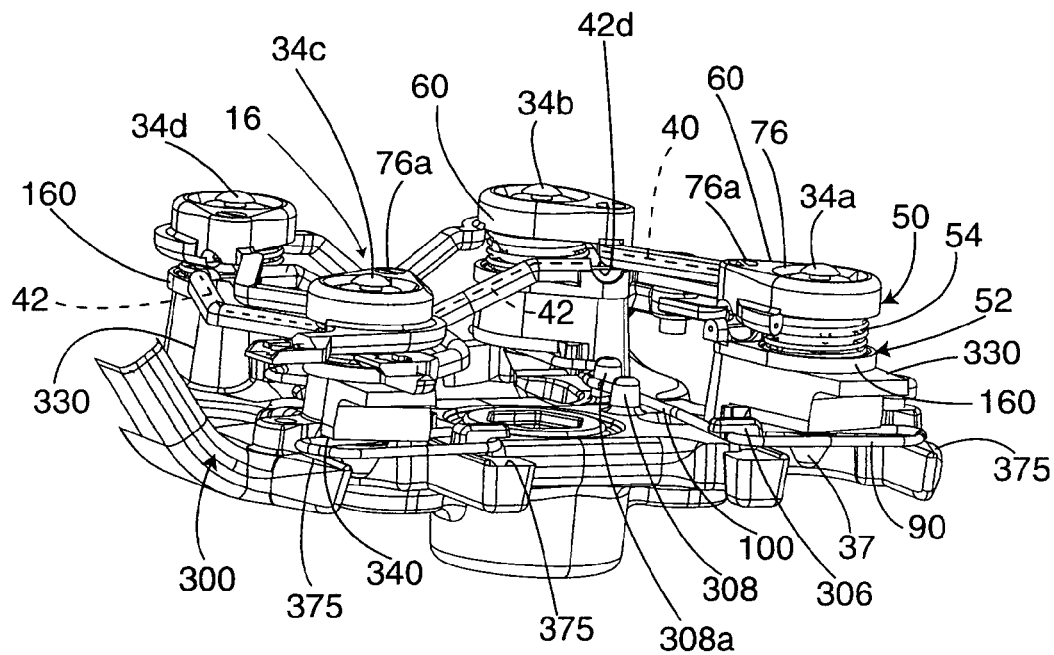
FIG. 6 is a perspective environmental view of the apparatus of FIG. 1 shown securing the air bag to the steering wheel.
Figure 6A:
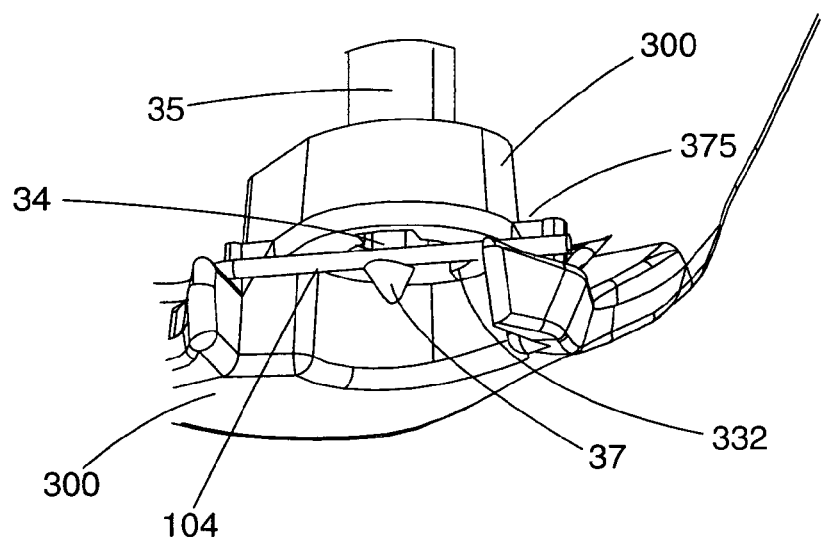
FIG. 6a is an alternate environmental view of the apparatus of FIG. 6 securing the air bag to the steering wheel.

The openings 76, 176 of the horn switch 16 are operable to receive a respective one of the pins or prongs 34a-d to align and couple the first or upper housing 50 to the second housing 52. Further, each support member 60 of the upper switch housing 50 includes an annular groove 86 (see FIG. 4) and each support member 160 of each second or lower housing member 52 includes an opposed groove 186 for receipt of a spring 54. Reference is again briefly made to FIG. 4 and also to FIG. 4a. Both of these figures are cross-sectional views shown in FIG. 5. FIGS. 4 and 4a show details of the plate 24, the prong such as 34a, the horn switch 16, attachment mechanism 20 and armature 300. As can be appreciated, the plate 24 has been removed from FIG. 5 to avoid complicating this figure and prongs 34 (with the hooked tips 37) are shown in phantom line.

The spring 54 may be any suitable coil spring. The spring 54 is of a suitable length and has a spring constant which is sized to displace the first housing 50 from the second housing 52, and thus the openings 76 of the first housing are spaced apart from the openings 176 of the second housing and the exposed portions 40a, 42a of conductors 40 and 42 are moved to a disengaged position. Compression of one or more of the springs 72 will cause the exposed section of wire 40a of the first housing 50 to contact the exposed section of wire 42a of the second housing 52, closing the electrical circuit as mentioned above.

Figure 2A:
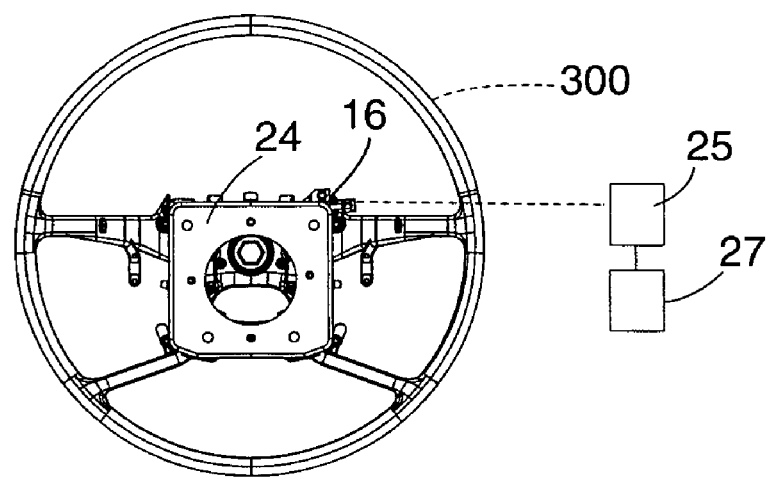
FIG. 2a is another plan view showing the air bag module plate secured to the steering wheel armature with the horn switch positioned between the plate and the armature.
Figure 2:
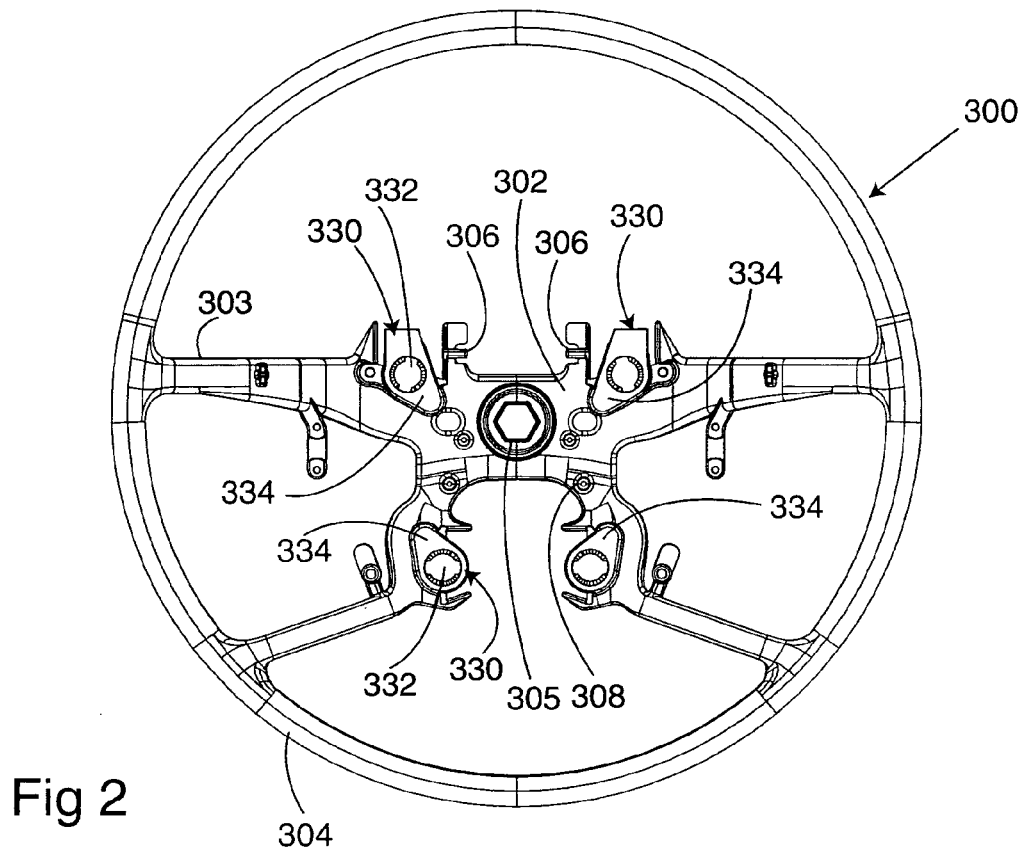
FIG. 2 is a top view of the steering wheel armature of FIG. 1.
Figure 3:
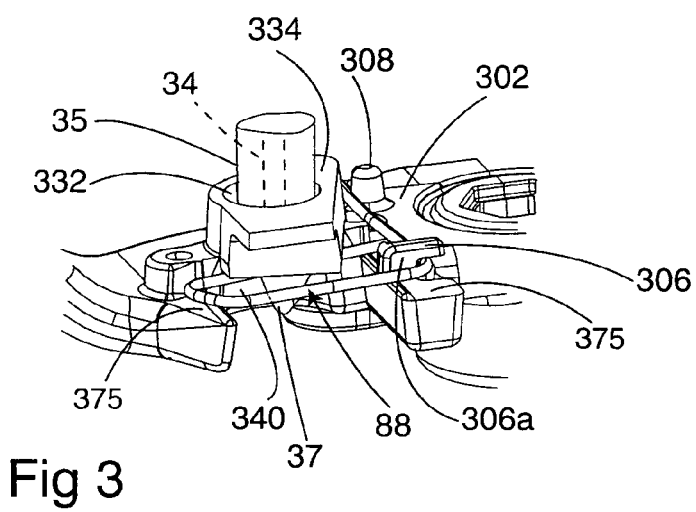
FIG. 3 is an exploded perspective view of a portion of the armature showing a portion of the attachment mechanism.
Figure 2B:
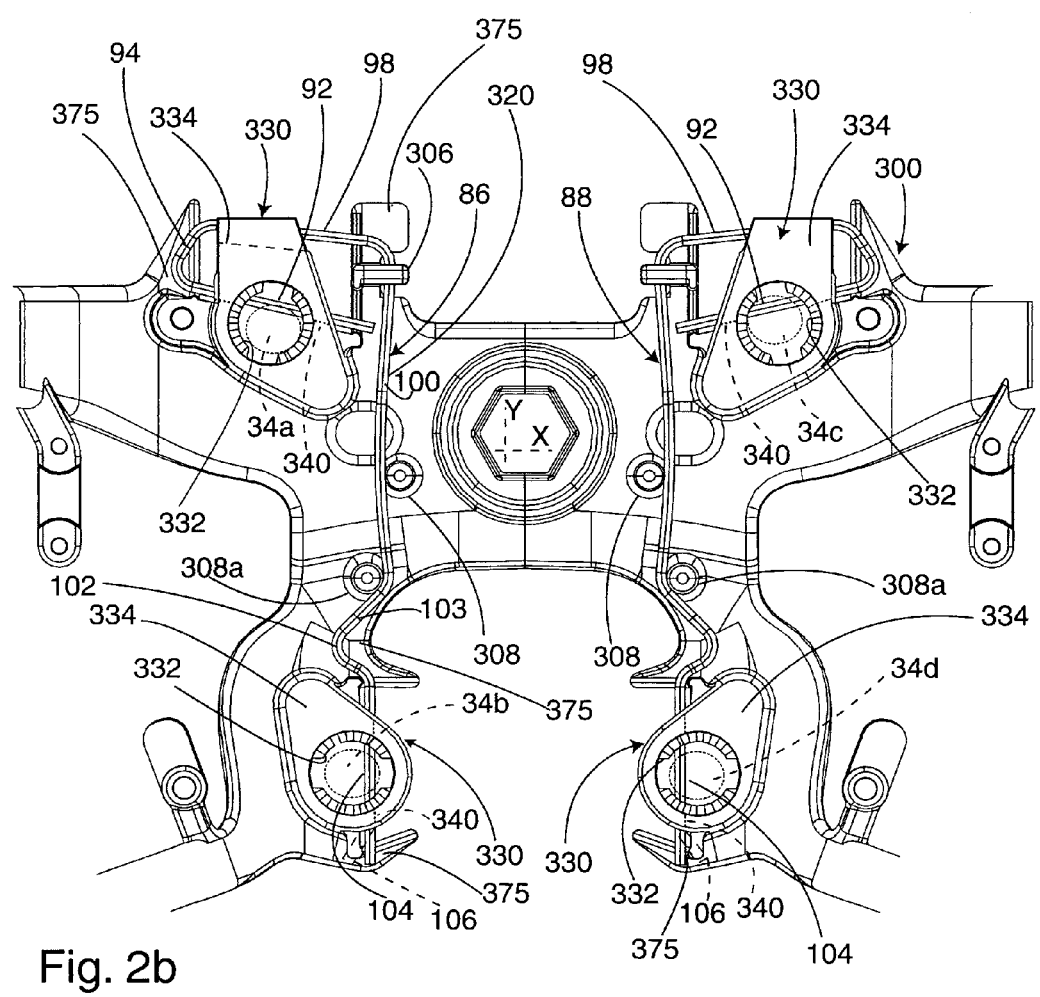
FIG. 2b is an enlarged view of a portion of the armature showing a portion of one of the attachment mechanisms.

As seen in FIGS. 1 and 2, the wheel 18 includes an armature 300, which is generally comprised of a cast metallic material, such as magnesium, aluminum or steel. The armature 300 defines a plurality of upraised support members 330, each support member including an opening 322 for receipt of one of the first, second, third or fourth prongs or pins 34a-d, and which extend from the mounting plate 24 to couple the air bag module 14 and horn switch (if used) to the wheel's armature. The top of each support member 330 has a flat surface, which operates as an anvil or reaction surface and receives and supports each of the housing 160 of the lower horn switch housing 52. The opening support members 332 may be configured with a locating flange (not shown) to ensure the openings 76, 176 of the horn switch 16 are properly aligned with the openings 332. The armature 300 may be further configured to include a plurality of first posts 308, and second posts 308a and hooks 306, which are operable to interface with the attachment mechanism 20, as will be described in greater detail below. The armature 300 further includes a hub region 302, which has a connector 305 to couple the armature 300 to a steering shaft (not shown) to enable the driver to steer the vehicle in a known manner.

A first embodiment of attachment mechanism 20 includes first and second retaining wires (spring clips) 86 and 88 disposed on the armature 300. The first retaining wire 86 and second retaining wire 88 are generally composed of a suitable material capable of elastic deformation, including polymers, but typically are composed of a metal such as aluminum or steel. The first retaining wire 86 and second retaining wire 88 are generally integrally formed with a uniform thickness; however, the first retaining wire 86 and second retaining wire 88 may be formed as distinct pieces and with varying thicknesses. The wire thickness is generally chosen such that the first retaining wire 86 and second retaining wire 88 may retain the pins 34a-d of the air bag module by being positioned upon a bearing surface 375 formed on the armature 300 and positioned in an engagement slot 340 under each support member 330.

The first retaining wire 86 and second retaining wire 88 are symmetrical and can be interchanged, thus the features of the first retaining wire 86 and second retaining wire 88 will be described jointly. Both the first retaining wire 86 and second retaining wire 88 each include a looped section 90 having a distal end in the form of a first diagonal section 92 operable to engage a first prong such as 34a or 34c (for wire 88). The opposite end of each wire 104, as will be seen, is operable to engage one of pins 34b or 34d (for wire 88) of the mounting plate 24, respectively.

The first diagonal section 92 is operable to be inserted in a slot or space 340 of a particular support member 330 and extend across an opening 332, as well as lie upon the bearing surface 375. It will be understood that although the term diagonal is used herein to describe various sections of the attachment mechanism 20, these sections may also be substantially straight. The first diagonal section 92 transitions to a second diagonal section 94. The second diagonal or arcuate section 94 serves to enable the first retaining wire 86 and second retaining wire 88 to extend a distance beyond adjacent portions the armature 300. The above distance provides room to insert a tool 96 (as shown in FIG. 7a) in the looped section 90 of each of the first and second retaining wires 86, 88. As will be discussed in greater detail below, the tool is used to disengage the wires 86 and 88 from the armature. The displaced wire is shown in dotted lined by number 88'; the displaced curved and distal sections are also shown in dotted line as numerals 102' and 104'.

The second diagonal section 94 may transition to a third section 98, which may extend generally perpendicular to the Y-axis (see dotted line in the center of the armature 300). The third section 98 is generally sized to enable a fourth section 100 to be positioned laterally (along an X-axis) of the support member 330. The fourth section 100 is generally straight to enable a top portion of fourth section 100 to be fitted below hook 306 and to permit a medial portion of section 100 to be bent about and engage a plurality of posts 308 and 308a formed on the armature 300. The engagement of the fourth section 100 with the hook 306 and with the plurality of posts 308, 308a creates a pre-selected amount of a pre-load force onto the first and second retaining wires 86, 88, securing them in place. Generally, the pre-load force is such that it results in the elastic deformation of the first and second retaining wires 86, 88 approximately one millimeter; however, it will be understood that the pre-load force may be in any desirable amount. The fourth section 100 is coupled to a fifth section 102, which has a bent or curved shape. The fifth diagonal section 102 also forms a ramped surface 103 to enable the disengagement of the fifth section 102 from its prong.

The sixth diagonal section 102 is angled 308a to laterally position a sixth section 104 outwardly to properly fit in the engagement slot 340 of a lower of the support members 330, as well as properly resting upon an adjacent one of the respective bearing surfaces 375. The sixth section 104 lies across opening 332 in a lower of this support member 330 and is engagable with one of the prongs 34 such as prong 34c (or 34d in the case of wire 88). The sixth section 104 extends generally parallel to the Y-axis. The sixth section 104 may be coupled to an optional seventh section 106, shown in phantom line. The seventh section 106 may extend diagonally from the sixth section 104.

Figure 7:
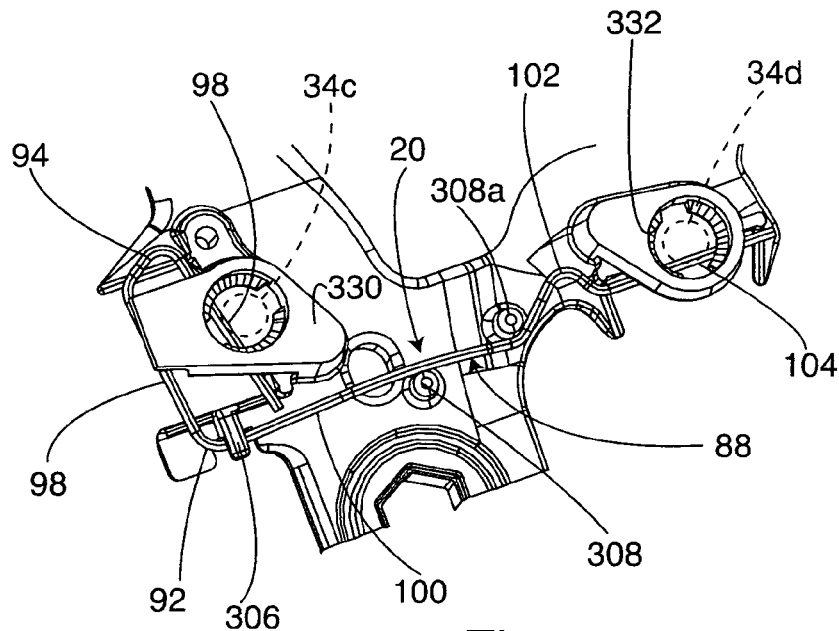
FIG. 7 is a partial, enlarged view showing an attachment mechanism in place upon a steering wheel armature.
Figure 7A:
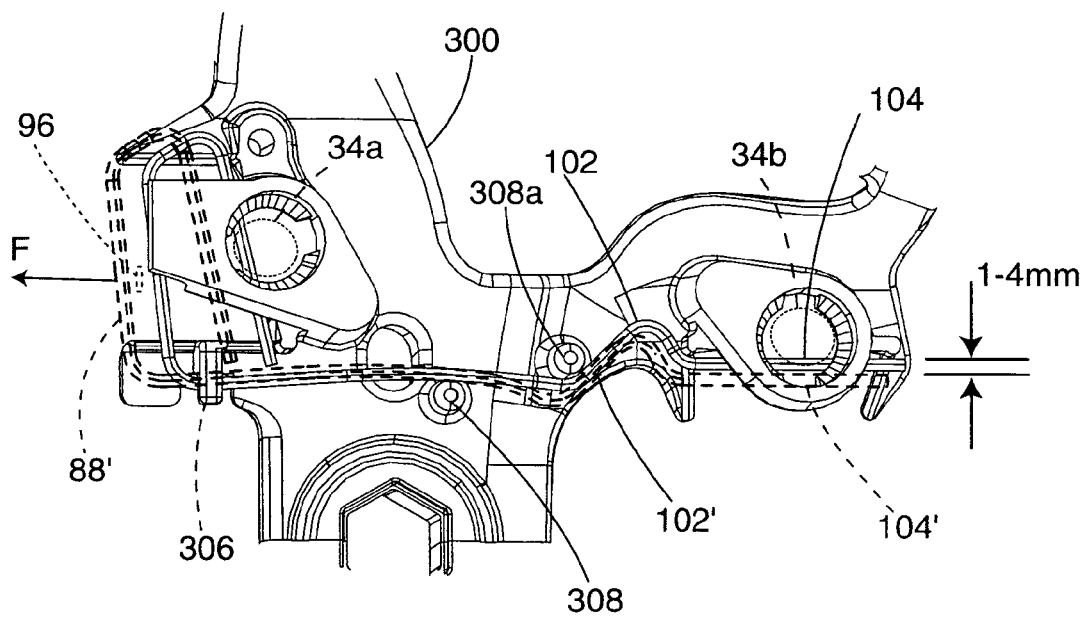
FIG. 7a shows the attachment mechanism of FIG. 7 partially disengaged from the armature.

With continuing reference to FIGS. 1 through 6, and additional reference to FIGS. 7 and 7a, the air bag module 14, and particularly prongs 34a-d, may be disengaged from the armature 300 of the wheel 18 by applying extractive forces at different locations of the attachment mechanism 20. In particular, the tool 96 may be inserted in the looped section 90, adjacent to the third section 98, to impart an extraction force F onto the chosen wire 86 or 88. The tool 96 may be any appropriate tool, such as a screwdriver, or in the alternative, a technician could impart the extractive force F with his hand (not shown). The tool 96 can also be used to apply the retractive force F to the looped portion of the second retaining wire 88 by applying a force to the corresponding third section 98.

With continuing reference to FIG. 7 and additional reference to FIG. 7a, as the extractive force F is applied to wire 86 (or to wire 88), wire 86 is moved outwardly. Section 92 moves away from prong 34a (or 34c as in the case of wire 88). Further, as the wire 86 is moved, section 102 and more particularly ramp 103 engages pin or prong 308a, which causes section 104 to move laterally inward (approximately 4 mm) away from prong 34b (or prong 34d as in the case of wire 88). The further application of force F causes wire 86 (or 88) to continue to slide past the upper post or pin 308 and then past the hook 306. As can be appreciated, the vertically extending portion 306a, see FIG. 3, of hook 306 operates as a pin or post, the horizontal portion of which limits the upward displacement of the wire 86 (or 88) while the wire is in place, and as the wire is being extracted. As each wire section disengages from a prong 34a-c and the hooked portion 37 of the prong, the force of a corresponding spring 54 (which biases the plate 24 upwardly via the horn switch 16) causes a prong 34a-d to move away from the displaced wire, assisting in disengaging the wire 86 (or 88) from the prongs.

FIGS. 8, 9 and FIGS. 10, 11 show similar but alternate embodiments of the invention. With additional reference to FIGS. 8 and 9, an alternative armature 300' and attachment mechanism 20' are shown. As the following description includes reference to the same or similar items previously described herein, the same or similar reference numerals will be used herein. With specific reference to FIGS. 8 and 9, the armature 300' includes three support members 330, each with an opening 332. The support members 330 and prongs 34a-c of plate 24' (shown in FIG. 8a) are triangular in shape. A center of one of the support members 330'a is located below the remaining two support members 300. Alternatively, with reference to FIGS. 10 and 11, a second alternative embodiment of the armature 300" and attachment mechanism 20" is shown. The armature 300" includes support members 330 with opening 332, which are orientated approximately 180 degrees from the armature 300' of FIG. 8.

Figure 8:
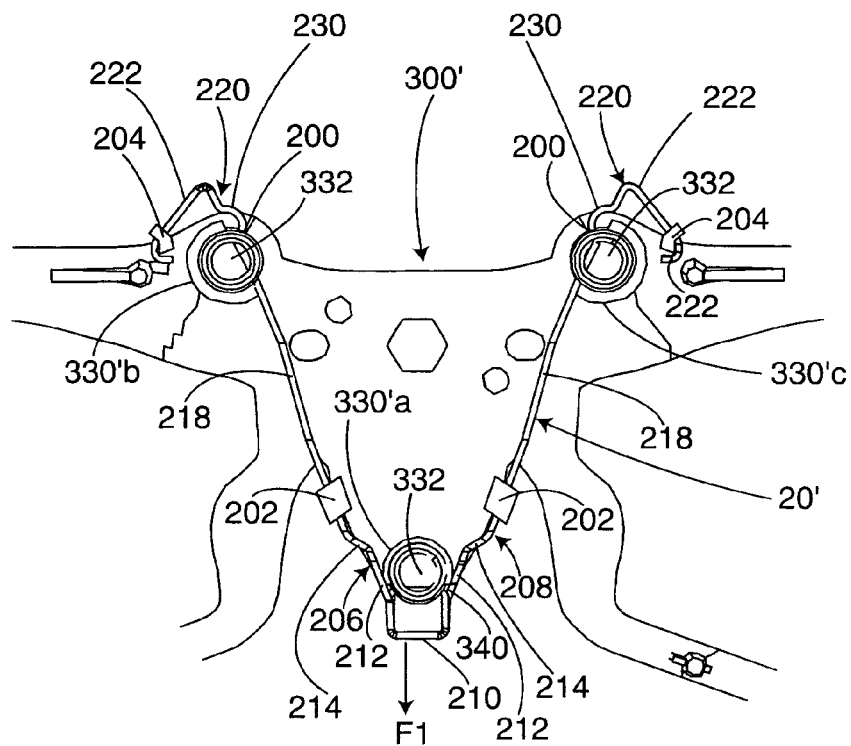
FIG. 8 is a perspective view of the apparatus for securing an air bag to a steering wheel according to a second alternative embodiment.
Figure 8A:
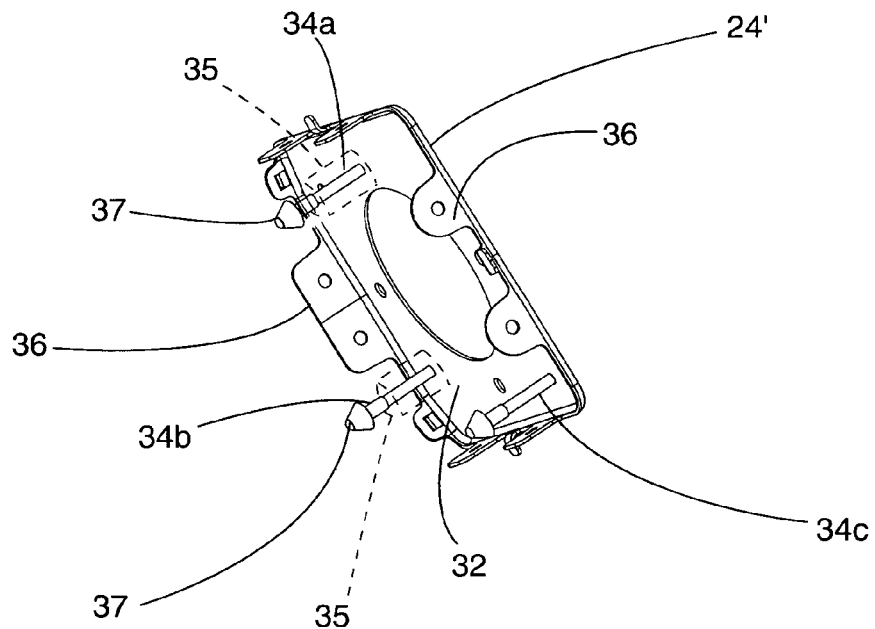
FIG. 8a is an isometric view of a triangularly shaped plate.
Figure 9:
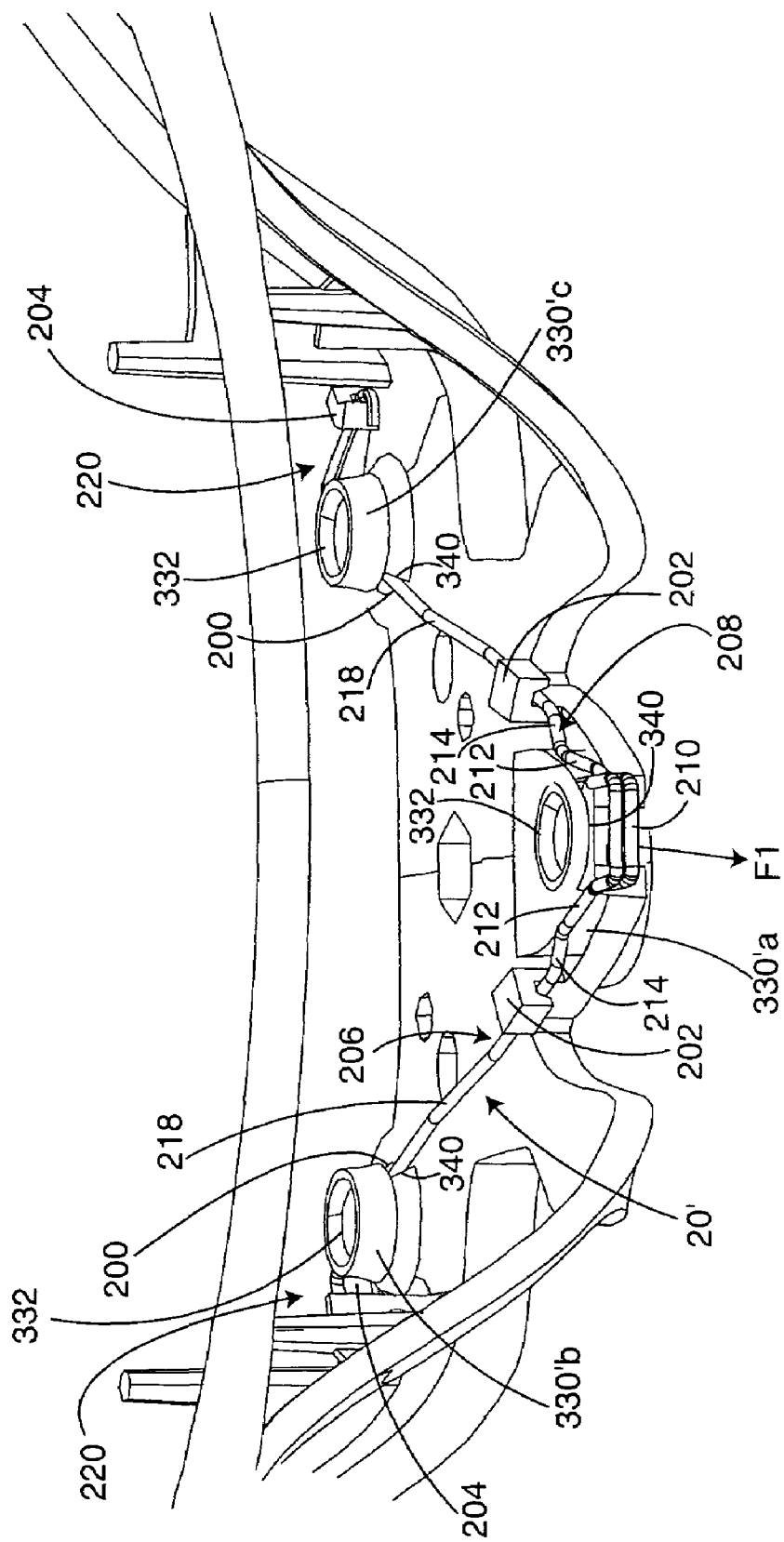
FIG. 9 is a detailed perspective view of the apparatus of FIG. 8.

With additional reference to FIGS. 8 and 9, each support member 330' may include a slot 340, which is operable to enable a portion of the attachment mechanism 20', which secures the first, second, and third prongs 34a-c of the mounting plate 24' (shown in FIG. 8a). As before, the slot 340 locates a portion of the attachment mechanism 20' within an opening 332 so that that portion of the attachment mechanism can engage with one of the hooks 37 of each prong 34a-c upon insertion of one of each prong 34a-c. The armature 300' further includes a plurality of first flanges or hooks 202 and a plurality of second flanges or hooks 204, which are each operable to engage the triangularly shaped attachment mechanism 20'.

The attachment mechanism 20' is generally symmetric about its center, and includes a first branch 206 coupled to a second branch 208 at a coupler 210. Generally, the first branch 206 and second branch 208 are formed of a continuous piece of wire formed into a triangular shape, which is formed into a loop to form the coupler 210; however, each portion could be individually formed and coupled together through any appropriate process, such as welding. The looped construction provides enhanced strength. As can be appreciated from the figures, the coupler 210 could also be formed as a single wire form that is generally U-shaped. The coupler 210 is further configured to engage the first prong such as 34a. The coupler is received in the slot 340 center of the support member 330'a. The first branch 206 and second branch 208 may each include a first diagonal section 212 coupled to a second diagonal section 214. The first diagonal section 212 may generally extend to a side of support member 330'a, and the second diagonal section 214 may extend oppositely along the opposing side of support member 330'a. The second diagonal section 214 may be coupled to a third diagonal section 218. The third diagonal section 218 is operable to engage the first flange 202 and the slot 340 formed in another of the support members 330'b or 330'c. The third diagonal section 218 is further coupled to a terminal section 220, a portion of which is positioned across one of the openings 332. Section 220 may generally include a section 222 to engage with one of the second flanges 204 and a curved section 230 configured to enable the easier release of a prong such as 34b or prong 34c from the armature.

Figure 10:
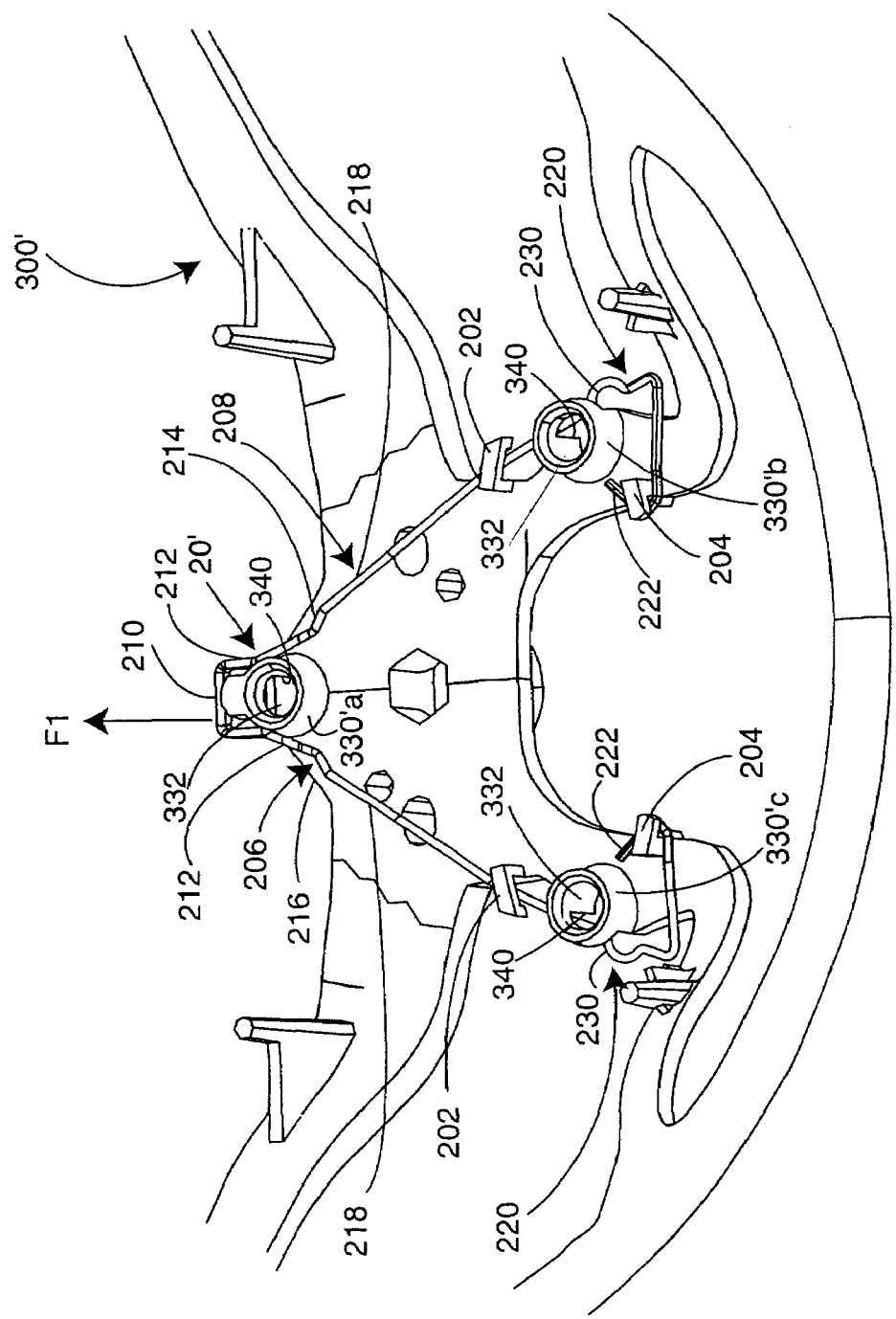
FIG. 10 is a perspective view of the apparatus for securing an air bag to a steering wheel according to a third alternative embodiment.
Figure 11:
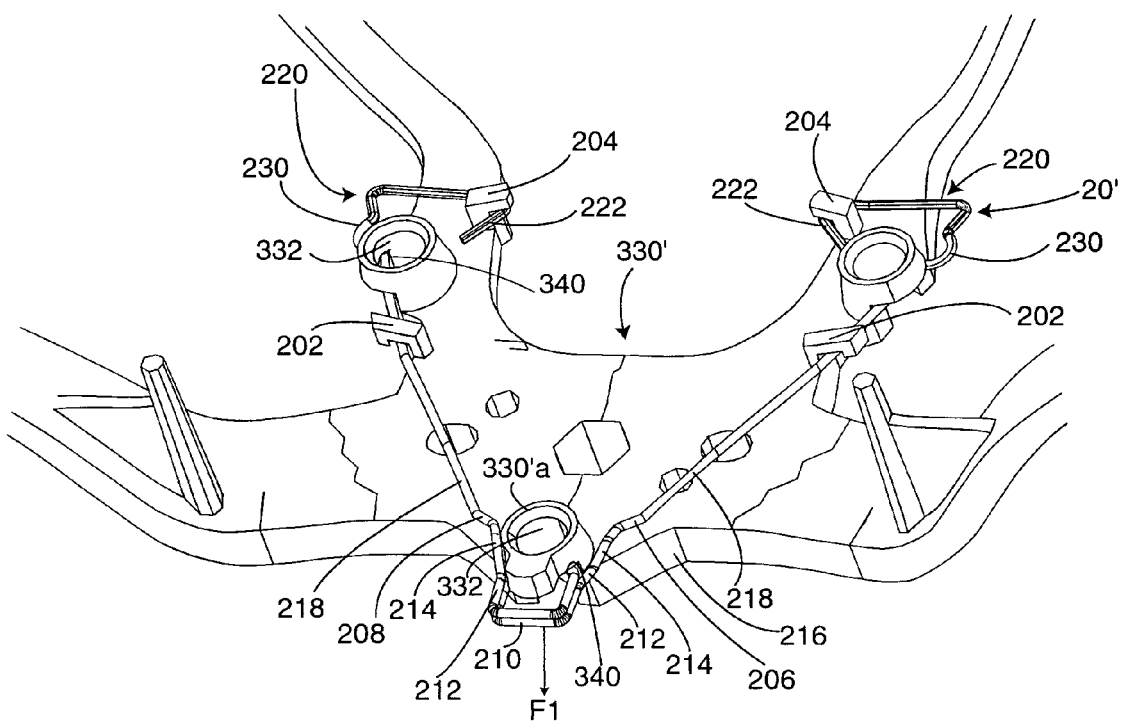
FIG. 11 is a detailed perspective view of the apparatus of FIG. 10.

After the plate 24' of an air bag module is secured to the armature 300' via the attachment mechanism 20', the plate 24' may be released from the armature 300' by applying a retractive force F1 to the coupler 210. The retractive force F1 can be applied by any appropriate means, such as by a tool or by hand (not shown). The application of the retractive force F1 to the coupler 210 will elastically deform the first branch 206 and second branch 208 to disengage the coupler 210 from the first prong 34a. Additionally, as the first branch 206 and second branch 208 elastically deform, the curved section 230 is moved into opening 332 to enable the release of the second and third prongs 34b and 34c. Thus, the application of the retractive force F1 will enable the air bag module 14' to be removed from the armature 300'. In FIGS. 10 and 11 the support members 330 are configured at 180 degrees to those in FIGS. 8 and 9 with the center support member 330'a oriented toward the top of the rim 304 of the armature 300'. The attachment mechanism and armature used in FIGS. 10 and 11 are substantially the same as used in FIGS. 8 and 9 and are also respectively referred to by numerals 300' and as 20'. The attachment mechanism for FIGS. 10 and 11 is removed in the same way as described in conjunction with FIGS. 8 and 9.

Figure 12:
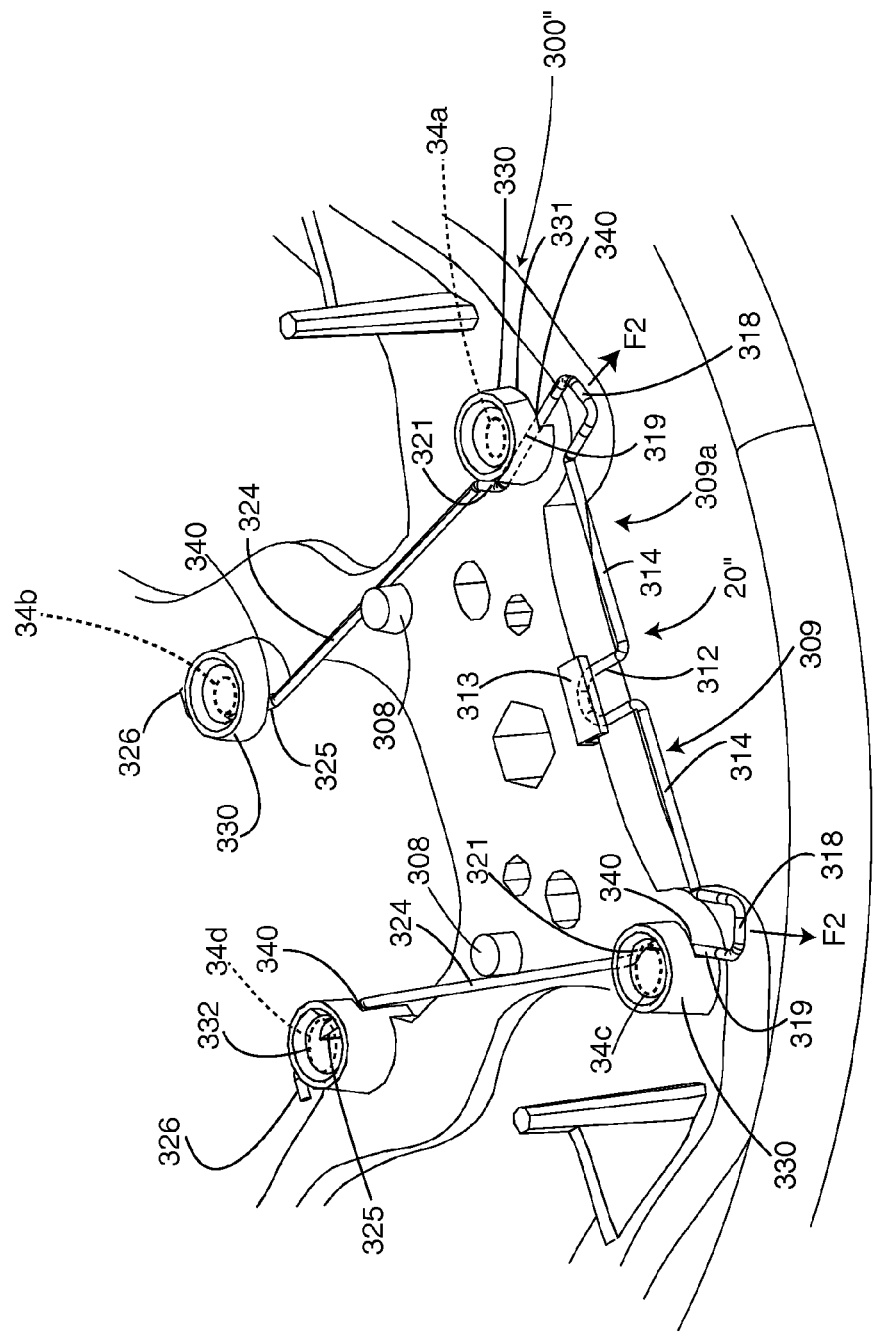
FIG. 12 is a perspective view of the apparatus for securing an air bag to a steering wheel according to a fourth alternative embodiment.

With reference now to FIG. 12, an armature 300''' is shown with an attachment mechanism 20'''. As the following description includes reference to the same or similar items previously described herein, the same or similar reference numerals will be used herein. The armature 300''' includes a flange 300a formed adjacent to a hub 302. The armature 20''' includes support members 330, each with an opening 332. The support members 330 are arranged much like that shown in FIG. 2. Each support member 330''' includes a slot 340 operable to receive the attachment mechanism 20''.

The attachment mechanism 20'' includes a first branch 309 and a symmetrically opposite second branch 309a. The first branch 309 and second branch 309a are generally formed from one integral piece, such as a formed metallic wire; however, the first branch 309 and second branch 309a may be comprised of any appropriate material and composed through any appropriate technique. The first branch 309 and second branch 309a are coupled together via a U-shaped section 312. The U-shaped section 312 is configured to engage a raised flange or hook 313 of the armature 300'' to secure a portion of the attachment mechanism 20'' to the armature 300''. The first branch 390 and second branch 309a each include a first lateral section 314, which extends from the U-shaped section 312. Each first lateral section 314 is coupled to a second U-shaped section 318, which is operable to disengage the attachment mechanism 20'', as will be described in greater detail below.

The second U-shaped section 318 is coupled to a first diagonal section 319, which is operable to extend through the slot 340 of a support member 330. Section 319 is operable to engage a hook 37 of one of the prongs 34a-d (shown in phantom line in FIG. 12) of a plate (such as 24) of an air bag module. The first diagonal section 319 may be coupled to a second diagonal section 321, which extends laterally outward and correctly positions section 324 relative to a post 308 to generate the desired contact force with the post 308. The second diagonal section 321 is coupled to a third diagonal section 324 and serves to facilitate the engagement of the third diagonal section 324 with post 308 and a slot 340 of a support member 330''. The third diagonal section 324 is coupled to a fourth diagonal section 325, which is received in a selected slot 340 and retained by one of the prongs 34b or 34d. Section 325 is further coupled to a curved terminal portion 326, which is configured to assure the fourth diagonal section 325 remains situated in a chosen slot 340.

The various diagonal or angle sections facilitate the withdrawal or removal of the attachment mechanism 20''. In order to disengage the attachment mechanism 20'', a retractive force F2 may be applied to each second U-shaped section 318. The application of the retractive force F2 to both of the second U-shaped sections 318 will cause each fourth diagonal section 325 and first diagonal section 319 to slide out of its corresponding slot 340, thus releasing the corresponding prongs 34a-d, plate and air bag module from the armature 300''.

Figure 13:
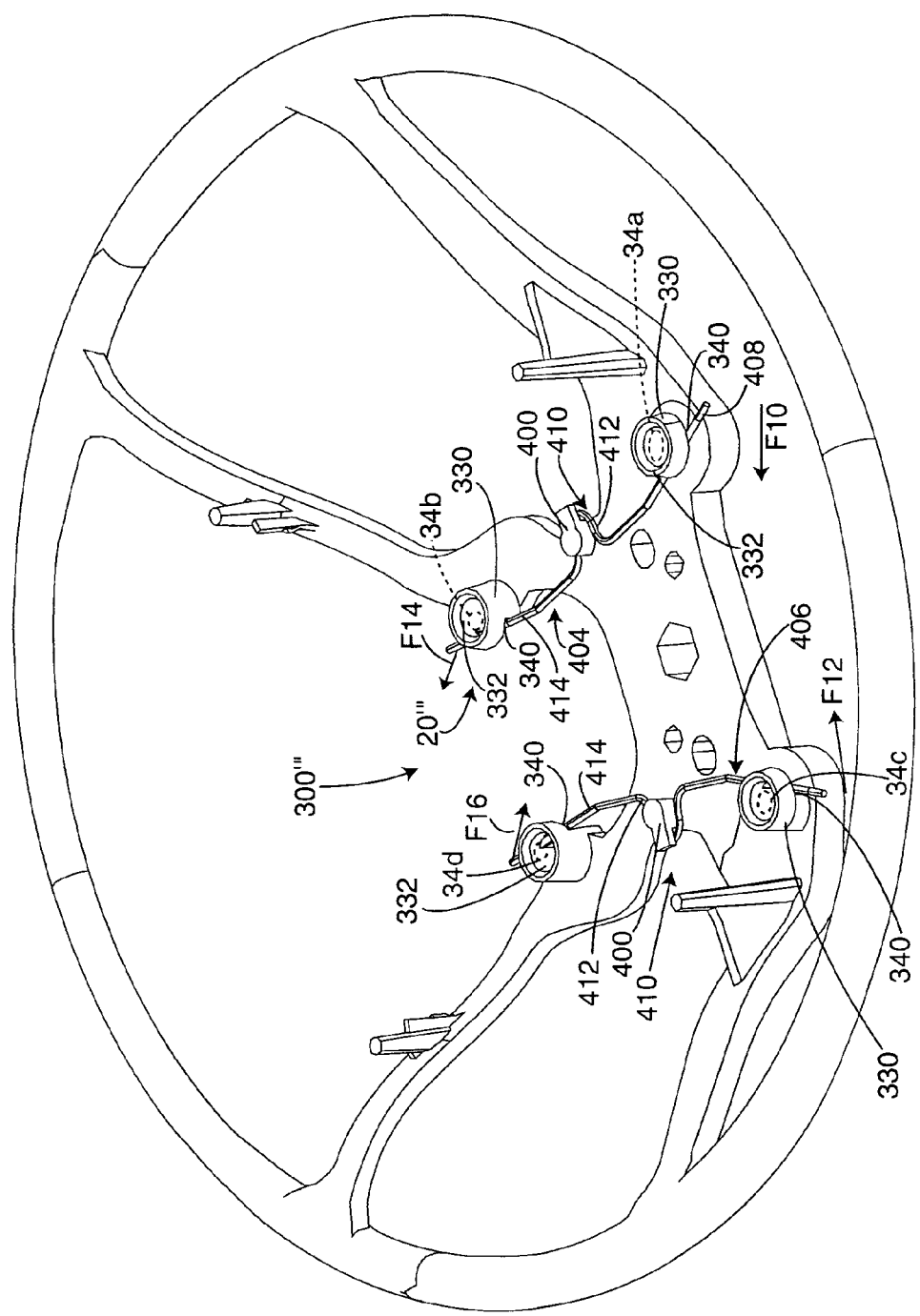
FIG. 13 is a perspective view of the apparatus for securing an air bag to a steering wheel according to a fifth alternative embodiment.

With reference now to FIG. 13, a third embodiment of the armature 300''' and attachment mechanism 20''' is shown. As the following description includes reference to the same or similar items previously described herein, the same or similar reference numerals will be used herein. The armature 300''' includes two upraised flanges or hooks 400, which may be of varying shape as necessary to engage the attachment mechanism 20'''. The armature 300''' may also include four support members 330, each with an opening 332, as well as a slot 340. The four openings 332 are configured to receive the first, second, third and fourth prongs 34a-d, shown schematically by phantom line, of the plate of the air bag module 14. Each slot 340 is operable to engage a portion of attachment mechanism 20''' to facilitate the securing of the prongs 34a-d.

Figure 14:
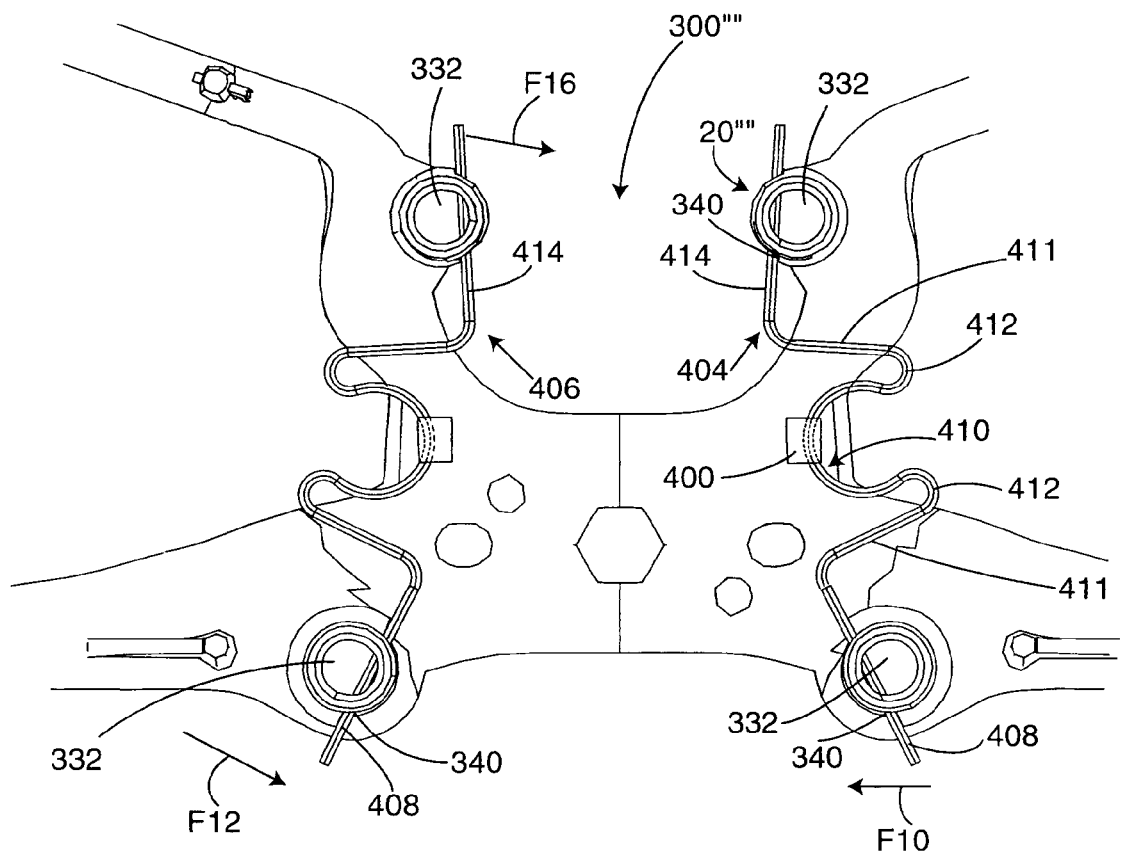
FIG. 14 is a perspective view of the apparatus for securing an air bag to a steering wheel according to a sixth alternative embodiment.

The attachment mechanism 20''' includes a first retaining wire 404 and a second retaining wire 406. The first retaining wire 404 and second retaining wire 406, which are identical in form, each includes a first diagonal section 408, which is configured to fit within a first of the slots 340 to secure the first and second prongs such as 34a or 34c of a plate such as 24. The first diagonal sections 408 are coupled to a curved section 410, which is of an inwardly facing C or U-shape. The curved section 410 may include one or two formed U-shaped sections 412. The curved section 410 is coupled to a second section 414, which may be diagonal depending on the dimension and number of U-shaped sections 412. The second section 414 is configured to fit within the slots provided by the hooks 400 and to extend into the slots 340 on each support member 330 to secure the third and fourth prongs such as 34a and 34c to the armature 300'''. Reference is briefly made to FIG. 14. The attachment mechanism 20'''' in FIG. 14 is similar to that of FIG. 13. The primary difference resides in the curved section 410, which resembles an outward facing C of U-shape. In view of the use of this outwardly facing curved section, the attachment mechanism 20'''' also includes transition section 411 on either side of section 410 to enable a transition to section 412 and 414.

In order to release the attachment mechanisms 20''' and 20'''', a first force F10 may be applied to the first diagonal section 408 to disengage the first retaining wire 404 from the first prong 34a''''. Next, a second force F12 may be applied to the other first diagonal section 408 to disengage the second retaining wire 406 from prong 34c, and a third force F14 may be applied to the second section 414 to disengage the first retaining wire 404 from the third prong 34c''''. Lastly, a fourth force F16 may be applied to the second section 414 to disengage the second retaining wire 406 from the fourth prong 34d.

The present invention greatly improves the ease of assembling an air bag module to an armature of a steering 18 by providing an attachment mechanism that does not require mechanical fasteners. In addition, the attachment mechanism of the present invention enables the quick and easy detachment of the air bag module 14 from the armature of the wheel 18 by enabling a tool or an operator to impart a force onto the attachment mechanism to release it.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An assembly comprising:
a steering wheel (18) including a plurality of support members (330);
a plurality of mounting members (34) associated with an automotive component, each mounting member having an extending element;
each support member including a body and an open passage, the open passage configured to receive one extending element (37) of a particular mounting member;
a resilient attachment mechanism (20) operable to couple each of the mounting members with corresponding portions of the steering wheel;
wherein the attachment mechanism (20) is operable to release the plurality of mounting members from the steering wheel upon the application of a retractive force applied to the attachment mechanism;
wherein each attachment mechanism includes first portion (90) configured to receive the retractive force, a resilient first leg (86, 88) situated near a middle of the attachment mechanism and a first distal end, the steering wheel further includes a first set (306, 308, 308a) of at least three posts, each of the three posts contacting the first resilient leg (86, 88) of the attachment mechanism, wherein a first (308) of the three posts is misaligned relative to the other two posts;
wherein the second (306) and third (308a) posts lie generally along an imaginary straight line wherein a portion of the first post (308) intersects with the straight line;
wherein the first resilient leg (86, 88) is configured that when it is in engagement with a surface of the first post (308), other adjacent portions of the first resilient leg are each forcefully urged against corresponding surfaces of the second (306) and the third (308a) posts;
wherein at least a second distal end (92) of the first portion or the first distal end (104) of the attachment mechanism extends perpendicularly through a corresponding open passage (332) of one of the support members (330) in a manner to interfere with the movement of an extending element of the mounting member through such open passage.

2. The assembly according to claim 1 including a resilient biasing member disposed between each mounting member and the steering wheel to bias such mounting member away from the steering wheel, each mounting member movable between an activated position when the resilient biasing member is compressed and a static position when the biasing member is free to expand.

3. The assembly according to claim 2 wherein the biasing member is part of a horn switch (16) which opens and closes an electrical circuit in correspondence with movement of the mounting member relative to the steering wheel.

4. The assembly according to claim 1 wherein at least one of the posts (306) includes a cap or hooked formation to retain the attachment mechanism (20) to the respective post.

5. The assembly according to claim 1 wherein one of the three posts (306) near the first portion (90) of the attachment mechanism includes a cap or hooked formation to retain the attachment mechanism thereto.

6. The assembly according to claim 1 wherein the first distal end and extending element (37) are each configured to permit passage of the extending element past the first distal end in one direction but prohibit movement of the extending element past the first distal end in an opposite direction.

7. The assembly according to claim 6 wherein the second distal end (92) is arranged at a non-zero angle relative to that portion of the first resilient leg (86, 88) located between the posts.

8. The assembly according to claim 7 wherein the second distal end (92) and a second extending element (37) of one of the mounting members are each configured to permit passage of the second extending element past the second distal end in one direction but prohibit movement of the second extending leg past the second distal end in an opposite direction.

9. The assembly according to claim 7 wherein the second distal end (92) is configured to be moved out of a respective open passage (332) of a support member to disengage from the second extending element, upon application of the retractive force, where the retractive force is applied in a direction to pull the first resilient leg passed each of the posts.

10. The assembly according to claim 9 wherein each support member (330) includes a groove (340) perpendicular to an associated open passage to receive and stabilize a respective distal end of the attachment mechanism and wherein a depth of the groove is sufficient to enable such respective distal end to be located at a position to intersect such open passage.

11. The assembly according to claim 10 wherein the attachment mechanism in between the first resilient leg and the first distal end includes a second portion, wherein the second portion includes a bent portion (102) extending at an angle away from an adjacent one of the posts (308a).

12. The assembly according to claim 11 wherein the second portion is configured to engage the adjacent post upon retraction of the attachment mechanism thereby moving the first distal end laterally away from the open passage of the corresponding support member to disengage with the corresponding extending element.

13. The assembly according to claim 12 further including a second attachment mechanism and wherein the steering wheel includes a second plurality of support members and a second set of posts which interact with the second attachment mechanism in the manner the attachment mechanism interacts with the other support members and posts.

14. An assembly comprising:
a steering wheel (18) including a plurality of support members (330);
a plurality of mounting members (34) associated with an automotive component, each mounting member having an extending element;
each support member including a body and an open passage, the open passage configured to receive one extending element (37) of a particular mounting member;
a resilient attachment mechanism (20) operable to couple each of the mounting members with corresponding portions of the steering wheel;
wherein the attachment mechanism (20) is operable to release the plurality of mounting members from the steering wheel upon the application of a retractive force applied to the attachment mechanism;
wherein each attachment mechanism includes first portion (90) configured to receive the retractive force, a resilient first leg (86, 88) situated near a middle of the attachment mechanism and a first distal end, the steering wheel further includes a first set (306, 308, 308a) of at least three posts, each of the three posts contacting the first resilient leg (86, 88) of the attachment mechanism, wherein a first (308) of the three posts is misaligned relative to the other two posts;

wherein at least a second distal end (92) of the first portion or the first distal end (104) of the attachment mechanism extends perpendicularly through a corresponding open passage (332) of one of the support members (330) in a manner to interfere with the movement of an extending element of the mounting member through such open passage.

15. The assembly according to claim 14 wherein the first distal end and extending element (37) are each configured to permit passage of the extending element past the first distal end in one direction but prohibit movement of the extending element past the first distal end in an opposite direction.

16. The assembly according to claim 15 wherein the second distal end (92) is arranged at a non-zero angle relative to that portion of the first resilient leg (86, 88) located between the posts.

* * * * *